(12) United States Patent
Ogaki (10) Patent No.: US 8,804,230 B2
(45) Date of Patent: Aug. 12, 2014

(54) LIGHT AMPLIFIER AND LASER PROCESSING DEVICE

(75) Inventor: Tatsuo Ogaki, Kusatsu (JP)

(73) Assignee: OMRON Corporation, Kyoto (JP)

( * ) Notice: Subject to any disclaimer, the term of this patent is extended or adjusted under 35 U.S.C. 154(b) by 158 days.

(21) Appl. No.: 13/468,357

(22) Filed: May 10, 2012

(65) Prior Publication Data

US 2012/0300288 A1 Nov. 29, 2012

(30) Foreign Application Priority Data

May 26, 2011 (JP) ................................. 2011-118041

(51) Int. Cl.
*H01S 3/102* (2006.01)
(52) U.S. Cl.
USPC .......................................... 359/333; 359/337
(58) Field of Classification Search
USPC ......... 359/333, 337, 341.3; 372/38.03, 38.06, 372/43.01
See application file for complete search history.

(56) References Cited

U.S. PATENT DOCUMENTS

| | | | |
|---|---|---|---|
| 5,128,601 A | 7/1992 | Orbach et al. | |
| 5,982,790 A | 11/1999 | Grossman et al. | |
| 7,817,683 B2 * | 10/2010 | Khitrov | ............................. 372/6 |
| 2004/0021840 A1 | 2/2004 | Heintze | |
| 2004/0160995 A1 | 8/2004 | Sauter et al. | |
| 2007/0223544 A1 * | 9/2007 | Yamazaki et al. | ....... 372/29.014 |
| 2010/0177797 A1 * | 7/2010 | Appleyard et al. | ........ 372/38.03 |
| 2010/0303105 A1 | 12/2010 | Zimer et al. | |
| 2012/0163402 A1 | 6/2012 | Oba et al. | |

FOREIGN PATENT DOCUMENTS

| | | |
|---|---|---|
| EP | 1447891 | 8/2004 |
| EP | 2363927 | 9/2011 |
| JP | 2000-340872 A | 12/2000 |
| JP | 2010-010274 A | 1/2010 |
| JP | 2010-115698 | 5/2010 |
| JP | 2010-171131 A | 8/2010 |
| WO | 2011/004806 | 1/2011 |

OTHER PUBLICATIONS

U.S. Appl. No. 13/468,432 to Tatsuo Ogaki, which was filed on May 10, 2012.
Search report from E.P.O., mail date is Jan. 10, 2014.

* cited by examiner

*Primary Examiner* — Mark Hellner
(74) *Attorney, Agent, or Firm* — Greenblum & Bernstein, P.L.C.

(57) ABSTRACT

A laser processing device includes a light amplifying fiber, a seed semiconductor laser (LD) for pulsing seed light multiple times during an emission period, an excitation LD for generating the exciting light of power at a first level during a non-emission period immediately before the emission period and generating the exciting light of power at a second level higher than the first level during the emission period, a light receiving element and a peak value detector for detecting power of an output light pulse which is output from the light amplifying fiber, and a control device. The control device controls the power of the exciting light of the non-emission period based on the detected value from the peak value detector to cause the power of first output light pulses which are generated during the emission period to be the same as the power of final output light pulses.

10 Claims, 12 Drawing Sheets

| NUMBER OF PULSES | REPETITION FREQUENCY | | | | |
|---|---|---|---|---|---|
| | F1~F2 | F2~F3 | F3~F4 | ... | Fn-1~Fn |
| 1 | a11 | a12 | a13 | ... | a1n-1 |
| 2 | a21 | a22 | a23 | ... | a2n-1 |
| 3 | a21 | a22 | a23 | ... | a3n-1 |
| .. | .. | .. | .. | ... | a4n-1 |
| m-1 | am-11 | am-12 | am-13 | ... | am-1n-1 |
| m | am 1 | am 2 | am 3 | ... | amn-1 |

LIGHT AMPLIFIER AND LASER PROCESSING DEVICE

CROSS-REFERENCE TO RELATED APPLICATION

This application claims benefit of priority under 35 U.S.C. §119 to Japanese Patent Application No. P2011-118041 filed on May 26, 2011, which is expressly incorporated herein by reference in its entirety.

BACKGROUND

1. Field of the Disclosure

The present disclosure relates to a light amplifier and a laser processing device, and particularly to a technique of stably generating a light pulse from a fiber amplifier in an MOPA (Master Oscillator and Power Amplifier) system.

2. Background Information

In laser processing devices, the laser beam power influences the processing quality. To address the problem, techniques of controlling the power of laser beam emitted from the laser processing device have been proposed.

For example, Japanese Patent Laid-Open No. 2000-340872 discloses a laser processing device including a fiber containing a rare-earth element and a laser light source for exciting the rare-earth element. The laser light source includes a first semiconductor laser which is sequentially driven to emit low powered light and a second semiconductor laser which is pulse-driven to emit high powered light. During a non-emission period, the rare-element doped fiber is made transition to a preliminary excited state by the exciting light emitted from the first semiconductor laser. During a processing period, the rare-element doped fiber is made transition to a highly excited state by the exciting light emitted from the second semiconductor laser. Since signal light is incident on the highly excited rare-element doped fiber, the high powered laser beam is emitted from the rare-earth doped fiber. The low powered laser beam preliminary excites the rare-earth doped fiber, and therefore, the pulse output during the processing period is stabilized.

On the other hand, Japanese Patent Laid-Open No. 2010-10274 discloses configuration for measuring the average power and the peak power of a laser pulse which is output from a fiber laser oscillator and feeding back the measurements to an LD (laser diode) drive circuit.

Further, Japanese-Patent Laid-Open No. 2010-171131, for example, discloses that the laser light source for emitting seed light to be incident on the fiber laser emits pulsed light during the main radiation period and emits substantially continuous light during the preliminary radiation period. The power of the continuous light is weaker than the peak power of the pulsed light. Japanese-Patent Laid-Open No. 2010-171131 also discloses that the power of the exciting light in the preliminary radiation period is lowered below the power of the exciting light in the main radiation period.

The laser processing device disclosed in Japanese Patent Laid-Open No. 2000-340872 uses a fiber laser. The fiber laser is capable of setting respective conditions for the laser beam such as (1) the pulse repetition frequency, (2) the pulse width, and (3) the pulse power independent from each other. On the other hand, the optimal output value of the low powered laser beam may depend on these conditions. When the output value of the low powered laser beam is not optimal, the strength of the first pulses is different from the strength of the stabilized pulses. That might degrade the processing quality.

The method disclosed in Japanese Patent Laid-Open No. 2010-10274 uses the average power of the laser pulse for a feedback control. Therefore, it is difficult to perform the control for each pulse.

In the configuration disclosed in Japanese Patent Laid-Open No. 2010-171131, the amplified light is emitted from the light amplifying fiber not only during the main radiation period but also during the preliminary radiation period.

With the configuration, the amplified light is emitted from the light amplifying fiber during the preliminary radiation period, which can prevent the optical fiber from accumulating too much energy during the preliminary radiation period. Accordingly, the power of the first pulses can be controlled below the excessive level during the main radiation period. However, Japanese Patent Laid-Open No. 2010-171131 does not specifically disclose the configuration for ensuring the above described control on the power of the pulse.

An object of the present disclosure is to provide a light amplifier which is capable of stably outputting a laser pulse from the first time and a laser processing device.

SUMMARY

In accordance with one aspect of the present disclosure, a light amplifier includes a light amplifying fiber for amplifying (that amplifies) seed light by exciting light, a seed light source for pulsing (that pulses) the seed light for a plurality of times during an emission period, an excitation light source for generating (that generates) the exciting light of power at a first level during a non-emission period which is immediately before the emission period and generating the exciting light of power at a second level which is higher (greater) than (that of) the first level during the emission period, a detector for detecting (that detects) power of an output light pulse which is output from the light amplifying fiber, and a control unit (a controller) for controlling (that controls) the power of the exciting light in the non-emission period based on the detected value from the detector to cause the power of first output light pulses which are generated during the emission period to be the same as the power of final output light pulses.

Preferably, during starting of the light amplifier, the control unit controls the power of the exciting light in the non-emission period for each of predetermined conditions of the output light pulse and obtains data on the power of the exciting light for causing the power of the first output light pulses to be the same as the power of the final output light pulses.

The light amplifier further includes a storage unit (storage) for storing the data in association with the predetermined conditions of the output light pulse.

Preferably, when the light amplifier is operated, the control unit sets the power of the exciting light in the non-emission period based on the data stored in the storage unit.

Preferably, the exciting light source is a semiconductor laser. The above described data is the data on a bias current in the semiconductor laser.

When the conditions for the output light pulse are changed, the control unit reflects the change made to the data on the bias current corresponding to the conditions before the change to the data on the bias current corresponding to the conditions after the change.

Preferably, the light amplifier further includes a shutter for preventing the output light pulse from being output to the outside of the light amplifier. The control unit obtains the data during starting of the light amplifier with the shutter closed.

In accordance with another aspect of the present disclosure, the laser processing device includes the light amplifier according to any of the above descriptions.

An object of the present disclosure, is to provide a light amplifier which is capable of stably outputting a laser pulse from the first time and a laser processing device.

DETAILED DESCRIPTION

Embodiments of the present disclosure will be described in detail below with reference to the drawings. The same or corresponding parts in the drawings are denoted by the same reference codes and not described repeatedly.

The term "group of pulses" here refers to a plurality of light pulses placed on a time axis at certain time intervals. The group of pulses is called "pulses" here except for the case where a light pulse included in a group of pulses is explicitly meant. The term "LD" here refers to a semiconductor laser.

Embodiment 1

Figure 1:
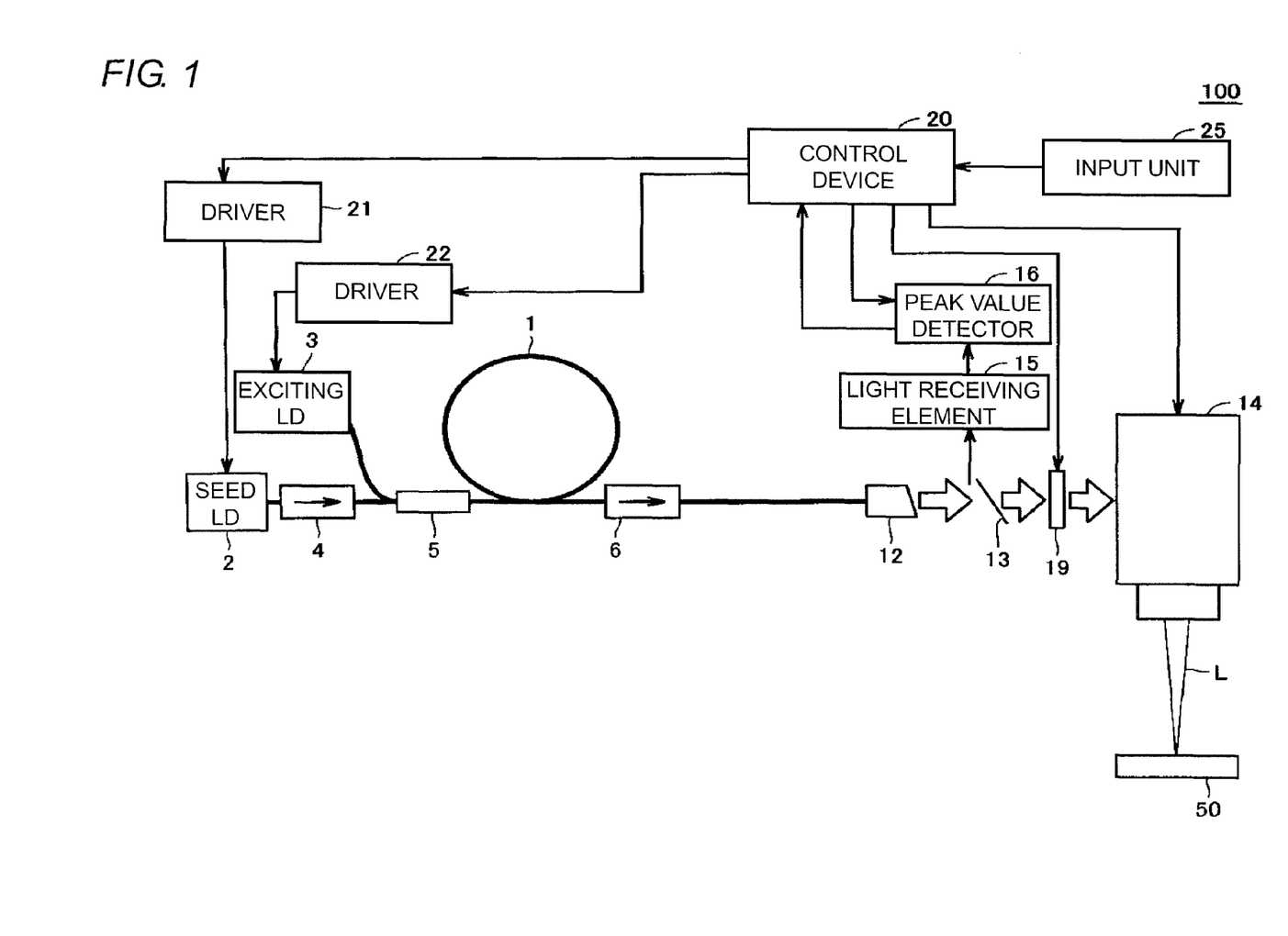
FIG. 1 is a diagram showing an exemplary configuration of a laser processing device according to Embodiment 1 of the present disclosure.

FIG. 1 is a diagram showing an exemplary configuration of a laser processing device according to Embodiment 1 of the present disclosure. In FIG. 1, a laser processing device 100 includes a light amplifier and a laser beam scanning mechanism 14 for scanning a laser beam emitted from the light amplifier. The light amplifier includes a light amplifying fiber 1, a seed LD 2, an exciting LD 3, isolators 4 and 6, a combiner 5, an end cap 12, drivers 21 and 22, a light receiving element 15, a peak value detector 16, a shutter 19, a control device 20, and an input unit 25.

The light amplifying fiber 1 has a core with a rare-earth element added as a light amplifying component and a clad provided around the core. The type of rare-earth element added to the core is not particularly limited and includes Er (erbium), Yb (ytterbium), and Nd (neodymium), for example. The rare-earth element will be described as Yb below. The light amplifying fiber 1 may be a single clad fiber with a layer of clad provided around the core or a double clad fiber with two layers of clad provided around the core.

The seed LD 2 is a laser light source for emitting seed light. The wavelength of the seed light is selected from the range from 1000 nm to 1100 nm, for example. The driver 21 pulse-drives the seed LD 2 by repeatedly applying a pulsed current to the seed LD 2. That is, pulsed seed light is emitted from the seed LD 2.

The seed light emitted from the seed LD 2 passes through the isolator 4.

The isolator 4 realizes a function of allowing only unidirectional light to transmit and block the light incident in the reverse direction. In the embodiment of the present disclosure, the isolator 4 allows the seed light from the seed LD 2 to transmit while blocking return light from the light amplifying fiber 1. Accordingly, it can prevent the return light from the light amplifying fiber 1 from entering the seed LD 2. If the return light from the light amplifying fiber 1 enters the seed LD 2, it may damage the seed LD 2, but the present disclosure can prevent the problem by providing the isolator 4.

The exciting LD 3 is excitation light source for emitting exciting light for exciting atoms of the rare-earth element added to the core of the light amplifying fiber 1. If the rare-earth element is Yb, the wavelength of the exciting light is 10 nm plus or minus over 915 nm, for example. The driver 22 drives the exciting LD 3.

The combiner 5 combines the seed light from the seed LD 2 with the exciting light from the exciting LD 3 and have the seed light enter the light amplifying fiber 1.

The light amplifying fiber 1, the seed LD 2, and the exciting LD 3 constitute a fiber amplifier in an MOPA (Master Oscillator and Power Amplifier) system. The exciting light entered in the light amplifying fiber 1 is absorbed by the atoms of the rare-earth element contained in the core and excites the atoms.

When the seed light from the seed LD 2 is propagated through the core of the light amplifying fiber 1, the seed light causes induced emission of the excited atoms, and therefore, the seed light is amplified. That is, the light amplifying fiber 1 amplifies the seed light by the exciting light.

When the light amplifying fiber 1 is a single clad fiber, both the seed light and the exciting light enter the core. On the other hand, when the light amplifying fiber 1 is a double clad fiber, the seed light enters the core and the exciting light enters the first clad. The first clad of the double clad fiber functions as a waveguide for the exciting light. When the exciting light entered in the first clad is propagating through the first clad, the rare-earth element in the core is excited according to the passing mode through the core.

The isolator 6 allows the seed light (light pulse) amplified by the light amplifying fiber 1 and emitted from the light amplifying fiber 1 to pass while blocking the light returning to the light amplifying fiber 1. The light pulse transmitted through the isolator 6 is emitted from the end surface of the optical fiber into the atmosphere.

The end cap 12 is provided to prevent the damage on the boundary surface between the end surface of the optical fiber and the atmosphere, the damage being caused when a light pulse of a high peak power is emitted into the atmosphere.

The beam splitter 13 splits the light pulse output from the end cap 12 into two pulses. One of the pulses is input into the laser beam scanning mechanism 14 as laser light for processing, and the other pulse is input into the light receiving element 15 for monitoring the power of the laser light.

The shutter 19 is provided to prevent the laser light for processing from being output to the outside of the light amplifier. The shutter 19 is opened and closed by the control device 20. As shown in FIG. 1, the shutter 19 is arranged between the beam splitter 13 and the laser beam scanning mechanism 14, for example.

The light receiving element 15 is made of a photodiode, for example.

The peak value detector 16 detects the peak power (peak value) of the light pulse by a signal from the light receiving element 15. The peak value detected by the peak value detector 16 is sent to the control device 20.

The laser beam scanning mechanism 14 is for scanning the laser light in a two dimensional direction. Although not shown, the laser beam scanning mechanism 14 may include a collimator lens for adjusting to a predetermined size the diameter of the laser beam that is output light from the end cap 12, a galvano-scanner for scanning the laser beam passed through the collimator on the surface of the processing object 50 in a two dimensional direction, and a F-theta lens for collecting the laser beam, for example.

When the laser light L, i.e., the output light from the laser processing device 100, is scanned in a two dimensional direction on the surface of the processing object 50, the surface of the processing object 50 made of metal and the like is processed. For example, information including a text, a shape, and the like is printed (marked) on the surface of the processing object 50.

The control device 20 provides integrated control over actions of the laser processing device 100 by controlling the drivers 21 and 22 and the laser beam scanning mechanism 14. The input unit 25 receives information from a user, for example. The control device 20 controls the drivers 21 and 22 while controlling actions of the laser beam scanning mechanism 14 based on the information from the input unit 25.

The control device 20 is implemented by a personal computer which executes a predetermined program, for example. The input unit 25 is not particularly limited and may be any device which allows the user to input information such as a mouse, a keyboard, a touch panel, or the like.

The seed LD 2, the exciting LD 3, the isolator 4 and the like may change in characteristics according to the temperature. Therefore, it is preferable for the laser processing device to include a temperature controller for keeping these devices at a constant temperature.

For outputting the laser light from the laser processing device 100, the seed LD 2 is driven by the driver 21 to generate pulsed seed light. When the seed light is repeatedly generated from the seed LD 2, the repetition frequency of the seed light depends on the repetition frequency of the pulsed current supplied from the driver 21 to the seed LD2. The repetition frequency of the pulsed current output from the driver 21 is controlled by the control device 20.

The control device 20 changes the power of the exciting light emitted from the exciting LD 3 by controlling the driver 22. The exciting LD 3 outputs the exciting light of the power according to the bias current supplied from the driver 22. The strength of the bias current output from the driver 22 is controlled by the control device 20.

Figure 2:
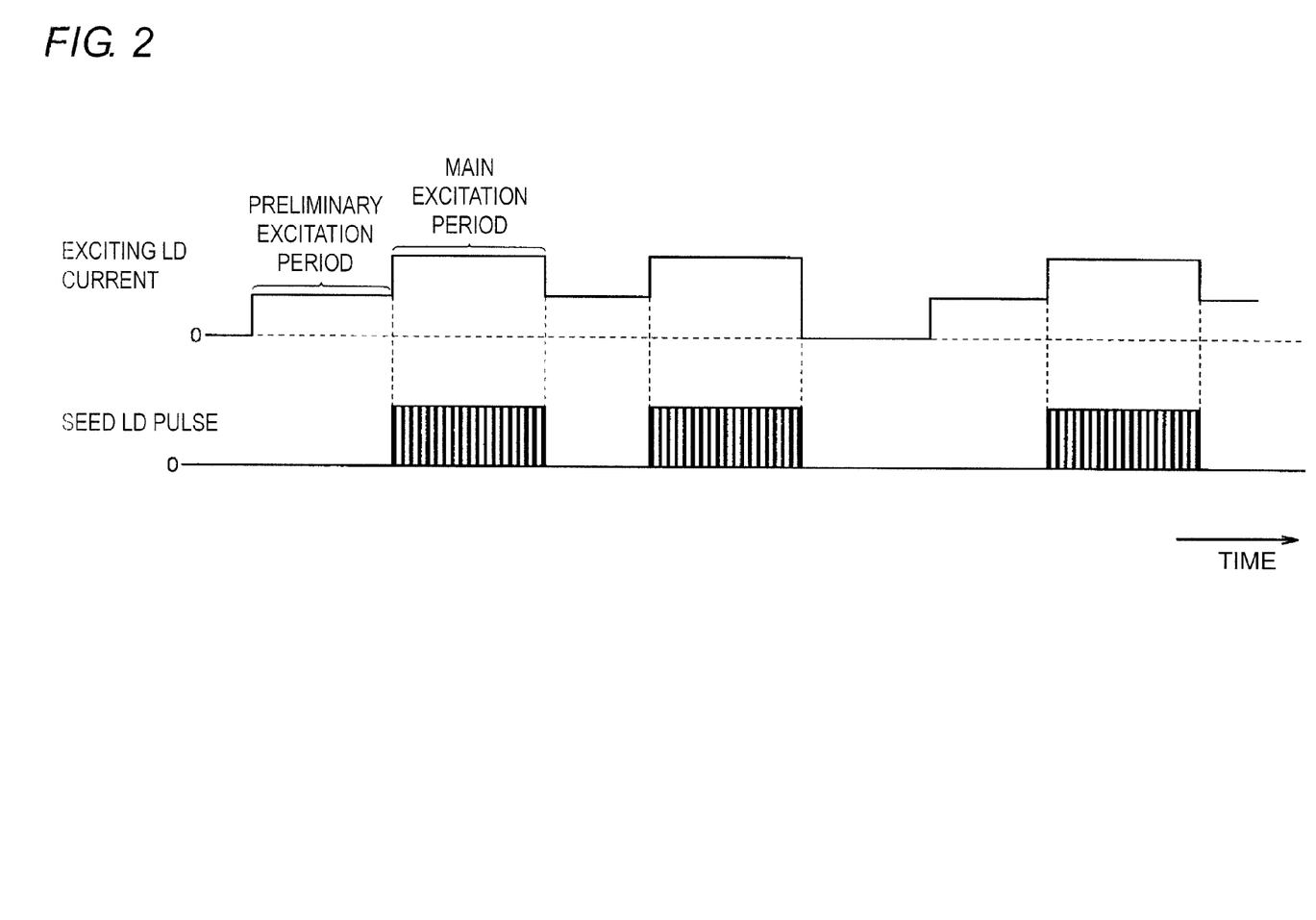
FIG. 2 is a timing diagram of laser emission by the laser processing device according to an embodiment.

FIG. 2 is a timing diagram of laser emission by the laser processing device according to Embodiment 1.

In FIG. 2, during the preliminary excitation period, the driver 22 supplies the bias current (shown as the exciting LD current in FIG. 2) to the exciting LD 3 to generate the exciting light, but the seed LD 2 does not generate the light pulse (shown as the seed LD pulse in FIG. 2). On the other hand, during the main excitation period, both the exciting light and the seed LD pulse are generated.

Therefore, the laser light is output from the fiber amplifier during the main excitation period.

The exciting LD current during the preliminary excitation period is lower than the exciting LD current during the main excitation period.

That is, the exciting LD 3 generates the exciting light of the power at a first level during the preliminary excitation period and generates the exciting light of the power at a second level during the main excitation period. The second level is higher than the first level.

Figure 3:
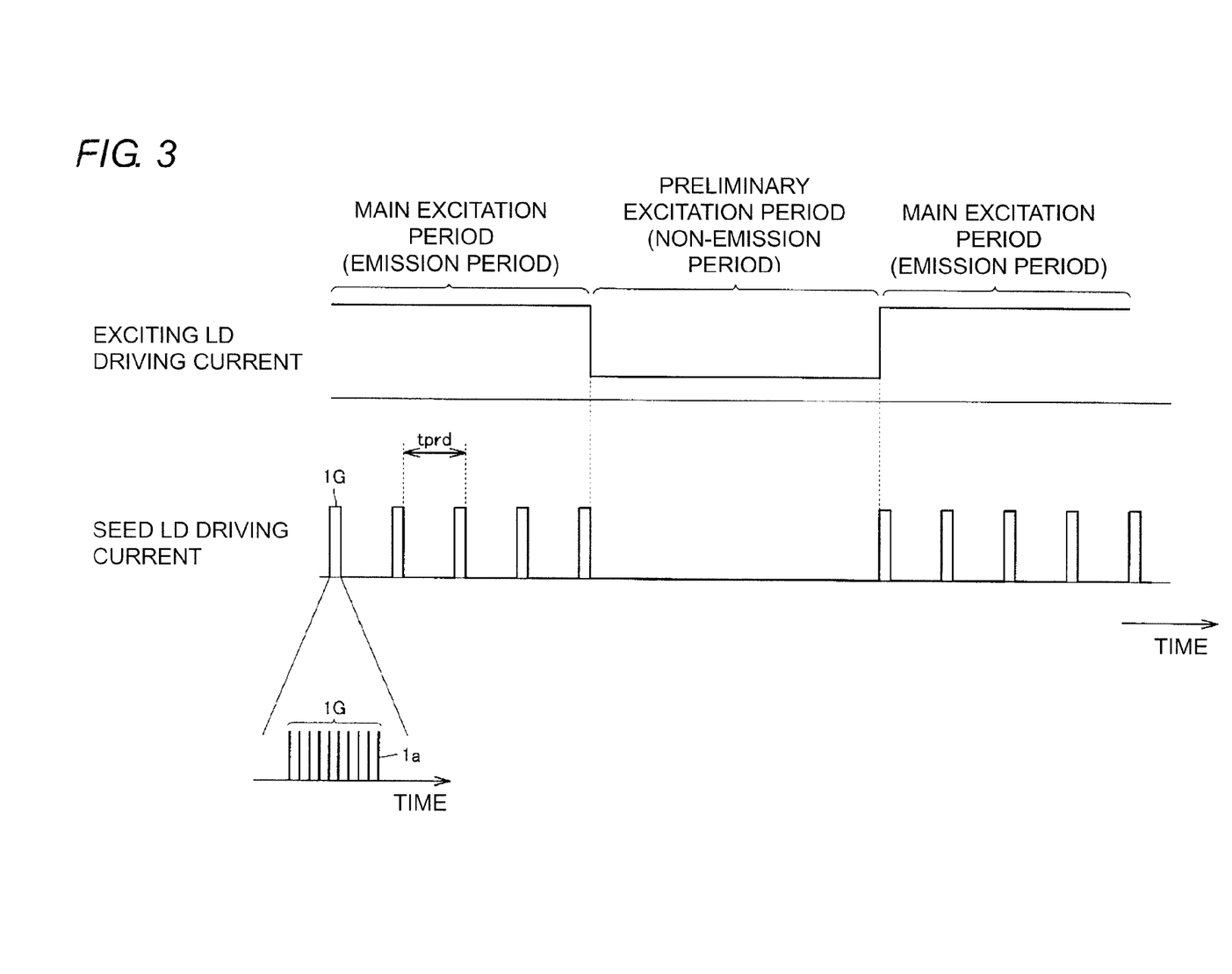
FIG. 3 is a diagram describing the timing of laser emission shown in FIG. 2 more in detail.

FIG. 3 is a diagram describing the timing of laser emission shown in FIG. 2 more in detail. In FIG. 3, the seed LD 2 repeatedly generates a group of pulses 1G including a plurality of seed light pulses 1a on a cycle tprd during the main excitation period. When the bias current of the seed LD 2 is modulated, the group of pulses 1G is generated on the predetermined cycle. The main excitation period corresponds to the emission period in which the laser light is output from the fiber amplifier. On the other hand, since the bias current is not supplied to the seed LD 2 during the preliminary excitation period, the preliminary excitation period is the non-emission period.

Among a plurality of groups of pulses output from the fiber amplifier during the main excitation period, the first output group of pulses is called the "first pulses" and the final output group of pulses is called the "final pulses" below.

Figure 4A:
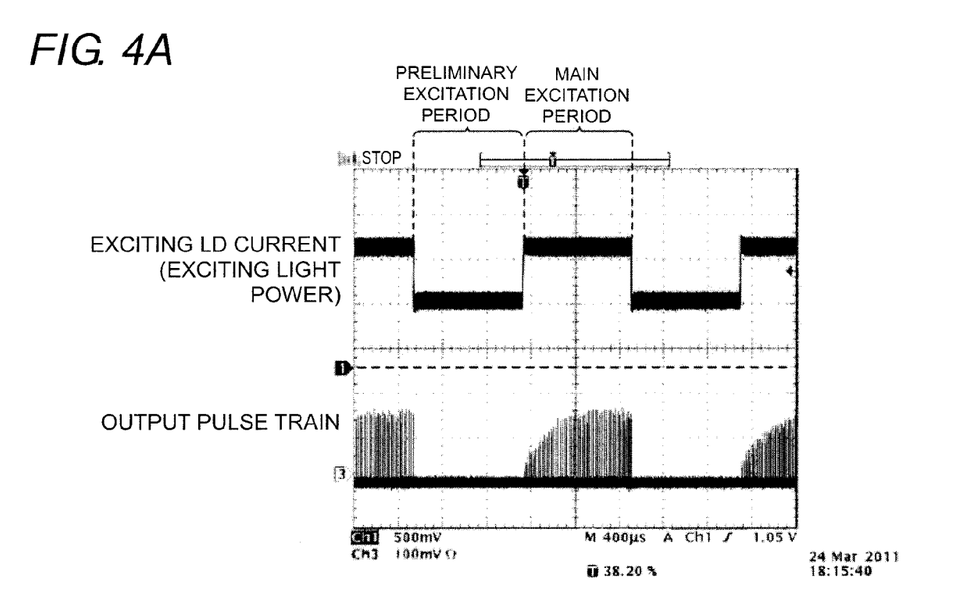
FIGS. 4A and 4B are waveform charts describing that the power of first pulses changes depending on the exciting light power in a preliminary excitation period.
Figure 4B:
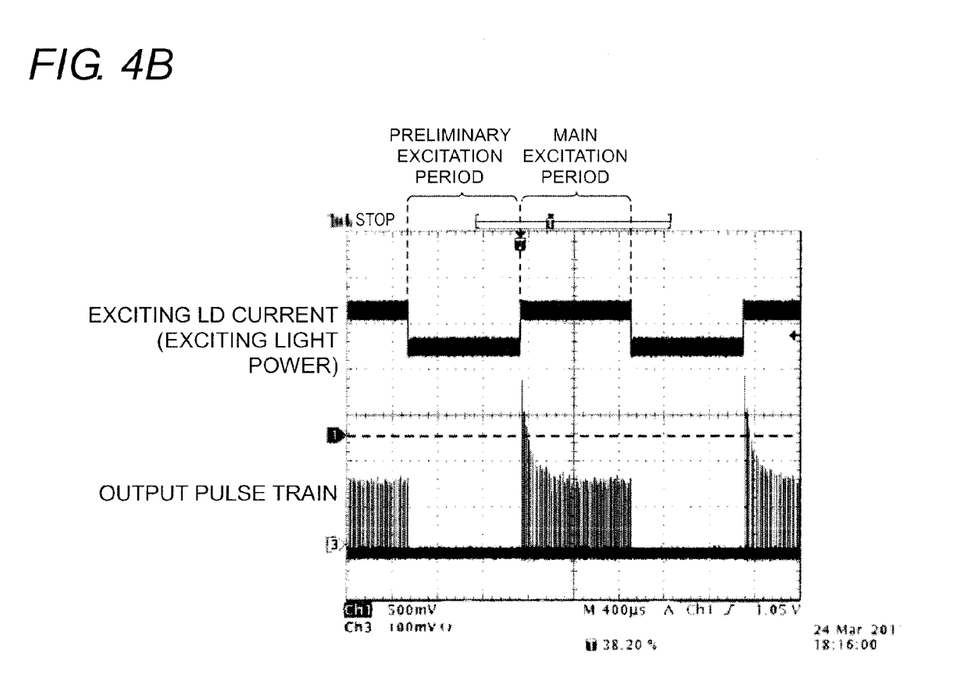

FIGS. 4A and 4B are waveform charts describing that the power of the first pulses changes depending on the exciting light power of the preliminary excitation period. FIG. 4A is a waveform chart showing the pulse output from the fiber amplifier when the exciting light power of the preliminary excitation period is low. FIG. 4B is a waveform chart showing the pulse output from the fiber amplifier when the exciting light power of the preliminary excitation period is high. In FIGS. 4A and 4B, since the exciting light power is low when the exciting LD current is low during the preliminary excitation period, a little energy is accumulated in the light amplifying fiber 1 during the preliminary excitation period. Therefore, the power of the first pulses is low. While the supplement of the exciting light power to the light amplifying fiber 1 and the emission of the light energy from the light amplifying fiber 1 are repeated, the energy accumulated in the light amplifying fiber 1 is increased to reach a substantially certain level. Accordingly, the power of the pulses is stabilized.

Conversely, when the exciting LD current during the preliminary excitation period is high, large energy is accumulated in the light fiber during the preliminary excitation period. Therefore, the power of the first pulses is high.

In that case, while the supplement of the exciting light power to the light amplifying fiber 1 and the emission of the light energy from the light amplifying fiber 1 are repeated, the energy accumulated in the light amplifying fiber 1 is decreased to reach a substantially certain level. Accordingly, the power of the pulses is stabilized.

As shown in FIG. 4, when the power of the exciting light during the preliminary excitation period (exciting LD current) is not optimal, the power of the first pulses is different from the power of the pulses after a certain period of time.

Such a difference between the powers causes the problem of degraded processing quality.

Figure 5:
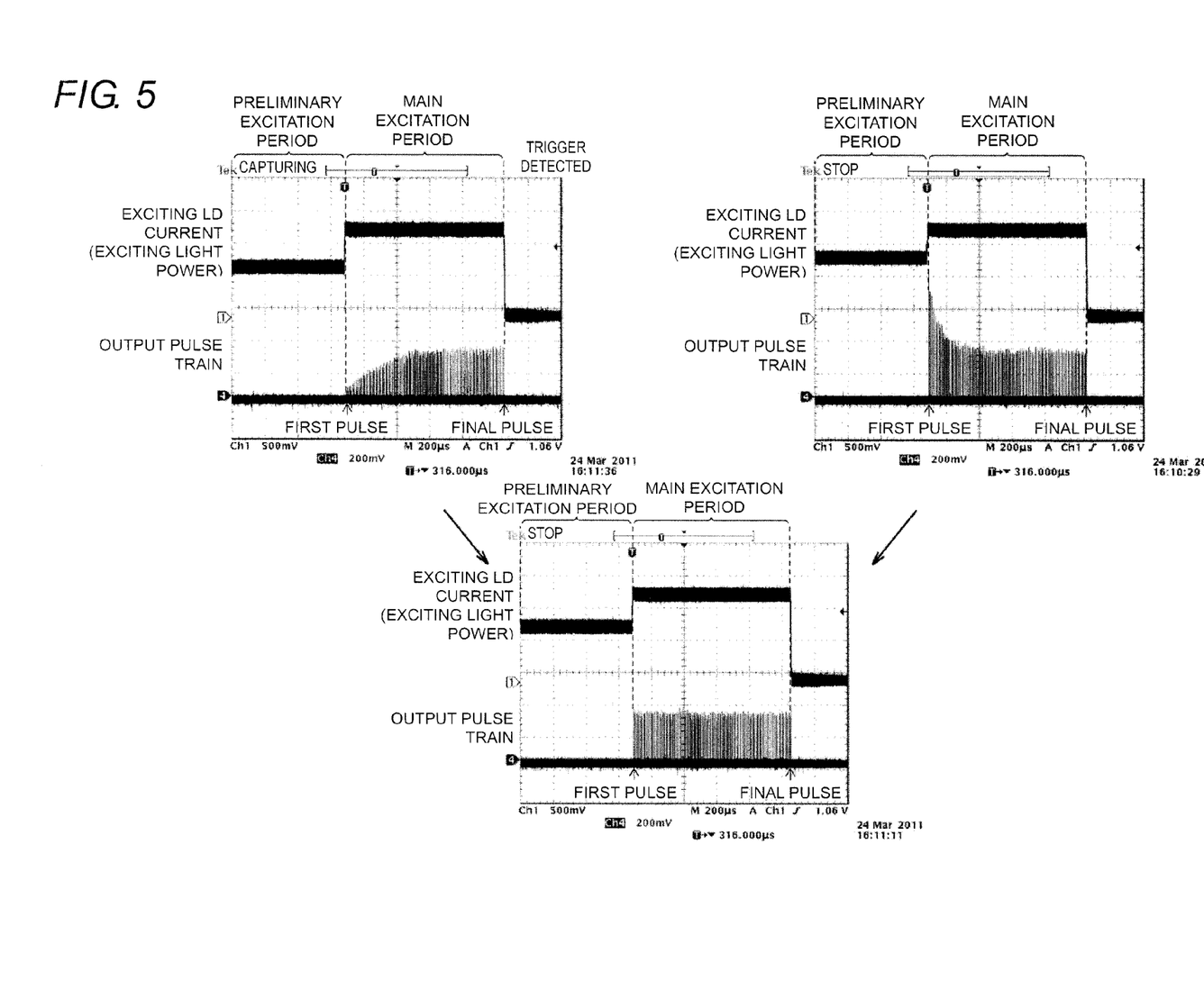
FIG. 5 is a waveform chart describing a theory of stabilizing the power of pulses according to an embodiment.

FIG. 5 is a waveform chart describing a theory of stabilizing the power of pulses according to Embodiment 1.

With reference to FIG. 5, the peak power of the first pulses is compared with the peak power of the final pulses in Embodiment 1. The compared result is fed back to the bias current value of the exciting LD 3 of the preliminary excitation period to bring the difference between the power of the first pulses and the power of the final pulses close to zero. Accordingly, the stabilized laser output can be realized from the first pulses. As shown in FIG. 1, the peak power of the pulses is detected by the light receiving element 15 and the peak value detector 16.

Figure 6:
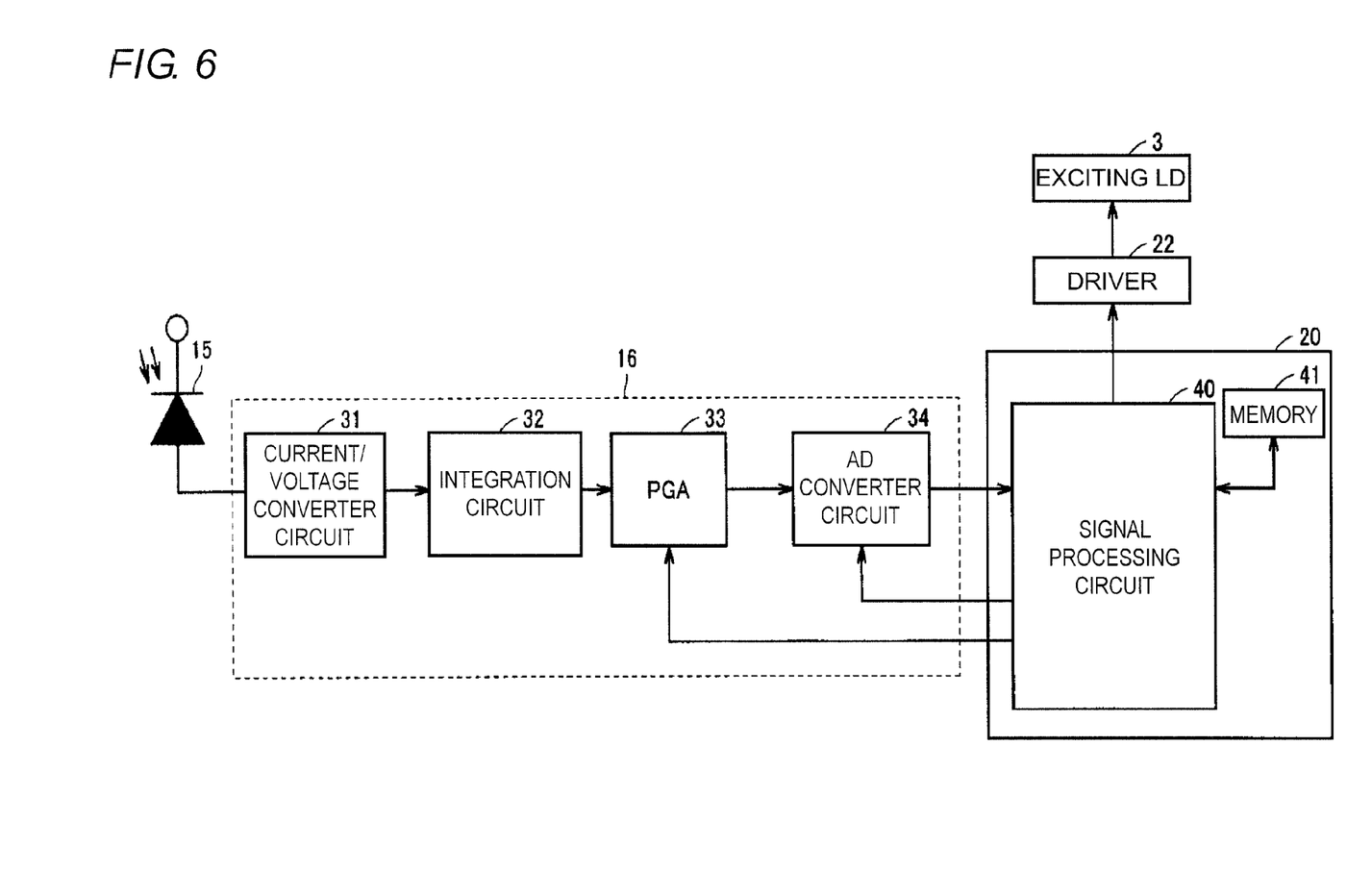
FIG. 6 is a block diagram showing an exemplary specific configuration for detecting a peak power of the pulses.

FIG. 6 is a block diagram showing an exemplary specific configuration for detecting a peak power of the pulses. In FIG. 6, the peak value detector 16 includes a current/voltage converter circuit 31, an integration circuit 32, a PGA (Programmable Gain Amplifier) 33, and an AD converter circuit 34. The control device 20 includes a signal processing circuit 40 and a memory 41.

The light receiving element 15 receives a light pulse and converts the light pulse into a current signal. The current/voltage converter circuit 31 converts the current output from the light receiving element 15 to voltage. The integration circuit 32 integrates the voltage output from the current/voltage converter circuit 31.

As shown in FIG. 3, a group of pulses including a plurality of short pulses (for example, the order of duration of ns) is generated in the embodiment. The integration circuit 32 integrates the waveform of the plurality of short pulses by a predetermined time constant. Consequently, the change in amplitude depending on the number of the short pulses included in the group of pulses can be reduced and the peak power (amplitude) of a single group of pulses can be obtained.

The PGA 33 amplifies the signal output from the integration circuit 32.

The gain of the PGA 33 is set by a gain setting signal from the signal processing circuit 40. Since the peak power (amplitude) in a single group of pulses decreases as the repetition frequency increases, the gain of the PGA 33 is adjusted to be higher according to the repetition frequency. Further, the gain of the PGA 33 is set to limit the amplitude of the signal input to the AD converter circuit 34 within the dynamic range of the AD converter circuit 34.

The AD converter circuit 34 is implemented by a high-speed AD converter circuit, for example, and converts an analog signal output from the PGA 33 into a digital signal. The timing of the AD conversion by the AD converter circuit 34 is controlled by a control signal from the signal processing circuit 40. Specifically, the signal from the PGA 33 is AD-converted after a predetermined delay time has passed from the starting of the laser emission.

The delay time is decided so that the AD converter circuit 34 performs the conversion near the peak of the power of the group of pulses.

Consequently, the peak power of the group of pulses, i.e., the peak value, is obtained. The repetition frequency and the time constant for integrating signals by the integration circuit 32, for example, are taken into account in deciding the delay time. The peak value obtained by the AD converter circuit 34 is sent from the AD converter circuit 34 to the signal processing circuit 40.

The signal processing circuit 40 compares the peak values of the first pulses with the final pulses. When the peak value of the first pulses is higher than the peak value of the final pulses, the signal processing circuit 40 generates a signal for decreasing the bias current value of the exciting LD 3 in the preliminary excitation period and sends the signal to the driver 22 during the preliminary excitation period. Conversely, when the peak value of the first pulses is lower than the peak value of the final pulses, the signal processing circuit 40 generates a signal for increasing the bias current value of the exciting LD 3 in the preliminary excitation period and sends the signal to the driver 22 during the preliminary excitation period. In response to the signal from the signal processing circuit 40, the driver 22 decreases or increases the bias current value of the exciting LD 3 in the preliminary excitation period.

Accordingly, the power of the exciting light from the exciting LD 3 is changed.

The memory 41 is implemented by a nonvolatile memory, for example, and saves the optimal value of the bias current value of the exciting LD 3 for each of the laser conditions. According to the result of the adjustment made by the signal processing circuit 40 to the bias current of the exciting LD 3, the optimal values stored in the memory 41 are updated.

Figure 7:
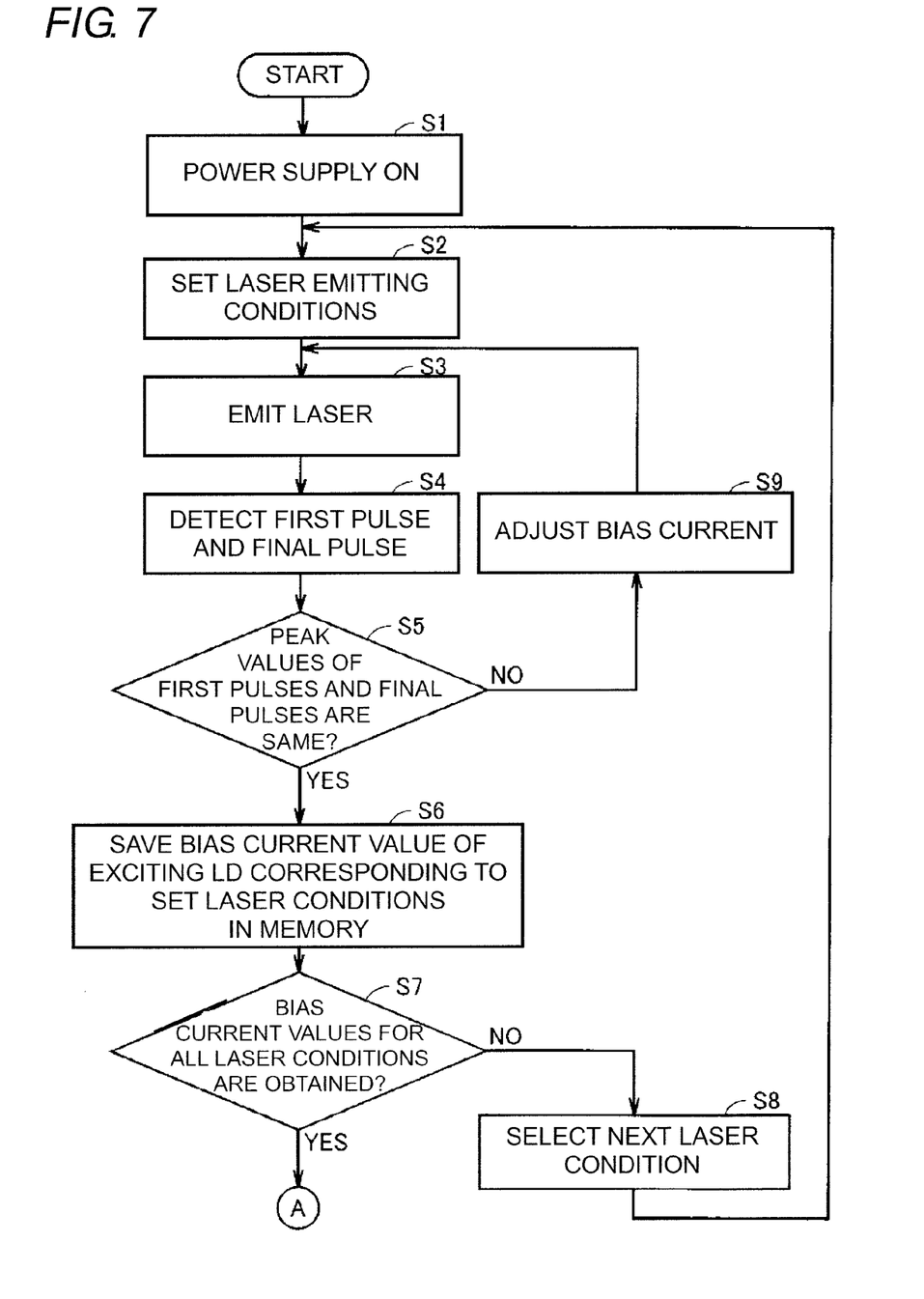
FIG. 7 is a flow chart for describing processing of the laser processing device during starting according to an embodiment.

FIG. 7 is a flow chart for describing processing of the laser processing device during starting according to Embodiment 1. In FIG. 7, the power supply of the laser processing device 100 is turned on in step S1. Accordingly, respective electric circuits such as the control device 20, the drivers 21 and 22 are started.

In step S2, the laser emitting conditions are set in the laser processing device 20. For example, the signal processing circuit 40 sets default conditions by referring to the table stored in the memory 41. Consequently, the repetition frequency of the pulses, the bias current values of the exciting LD 3 in the preliminary excitation period and the main excitation period, and the like are decided.

In step S3, the laser emission is performed. Specifically, the control device 20 controls the drivers 21 and 22 according to the conditions set in the processing in step S2. The drivers 21 and 22 drive the seed LD 2 and the exciting LD 3, respectively. Accordingly, the seed light from the seed LD 2 and the exciting light from the exciting LD 3 are input in the light amplifying fiber 1, and the laser light pulse is output from the light amplifying fiber 1.

The laser light pulse output from the light amplifying fiber 1 is split in the beam splitter 13. One of the laser light pulses is input into the light receiving element 15 and the peak value detector 16 detects the peak value of the pulse.

The shutter 19 is closed by the control device 20. Therefore, the other laser light pulse is not emitted to the laser beam scanning mechanism 14 by the shutter 19.

Next, in step S4, the control device 20 detects the first pulses and the final pulses via the light receiving element 15 and the peak value detector 16.

In step S5, the control device 20 determines whether the peak values of the first pulses and the final pulses are the same. The criteria for determining that "the peak values are the same" includes but not limited to the case where the two peak values match with each other. For example, when the ratio between the two peak values is within a predetermined range, it may be determined that "the peak values are the same".

If it is determined that the peak values of the first pulses and the final pulses are different (NO in step S5), the processing proceeds to step S9. In step S9, the control device 20 (the signal processing circuit 40) adjusts the bias current of the exciting LD 3 in the preliminary excitation period. When the peak value of the first pulses is higher than the peak value of the final pulses, the control device 20 decreases the bias current of the exciting LD 3 of the preliminary excitation period. On the other hand, when the peak value of the first pulses is lower than the peak value of the final pulses, the control device 20 increases the bias current of the exciting LD 3 in the preliminary excitation period.

When the processing in step S9 ends, the entire processing is returned to step S3. That is, the bias current of the exciting LD 3 corresponding to one of the laser conditions is adjusted until it is determined that the peak values of the first pulses and the final pulses are the same.

On the other hand, if it is determined that the peak values of the first pulses and the final pulses are the same (YES in step S5), the processing proceeds to step S6. In step S6, the control device 20 saves in the memory 41 the bias current value of the exciting LD 3 corresponding to the set laser conditions.

Consequently, the bias current value (the bias current value of the preliminary excitation period) of the exciting LD 3 for making the peak values of the first pulses and the final pulses the same is decided for a certain laser condition.

Subsequently, the control device 20 determines whether the bias current value of the exciting LD 3 is obtained for all the laser conditions. If the bias current value has not been decided for a laser condition (NO in step S7), the processing proceeds to step S8. In step S8, the signal processing circuit 40 selects the next laser condition. When the processing in step S8 ends, the entire processing is returned to step S2.

Figure 9:
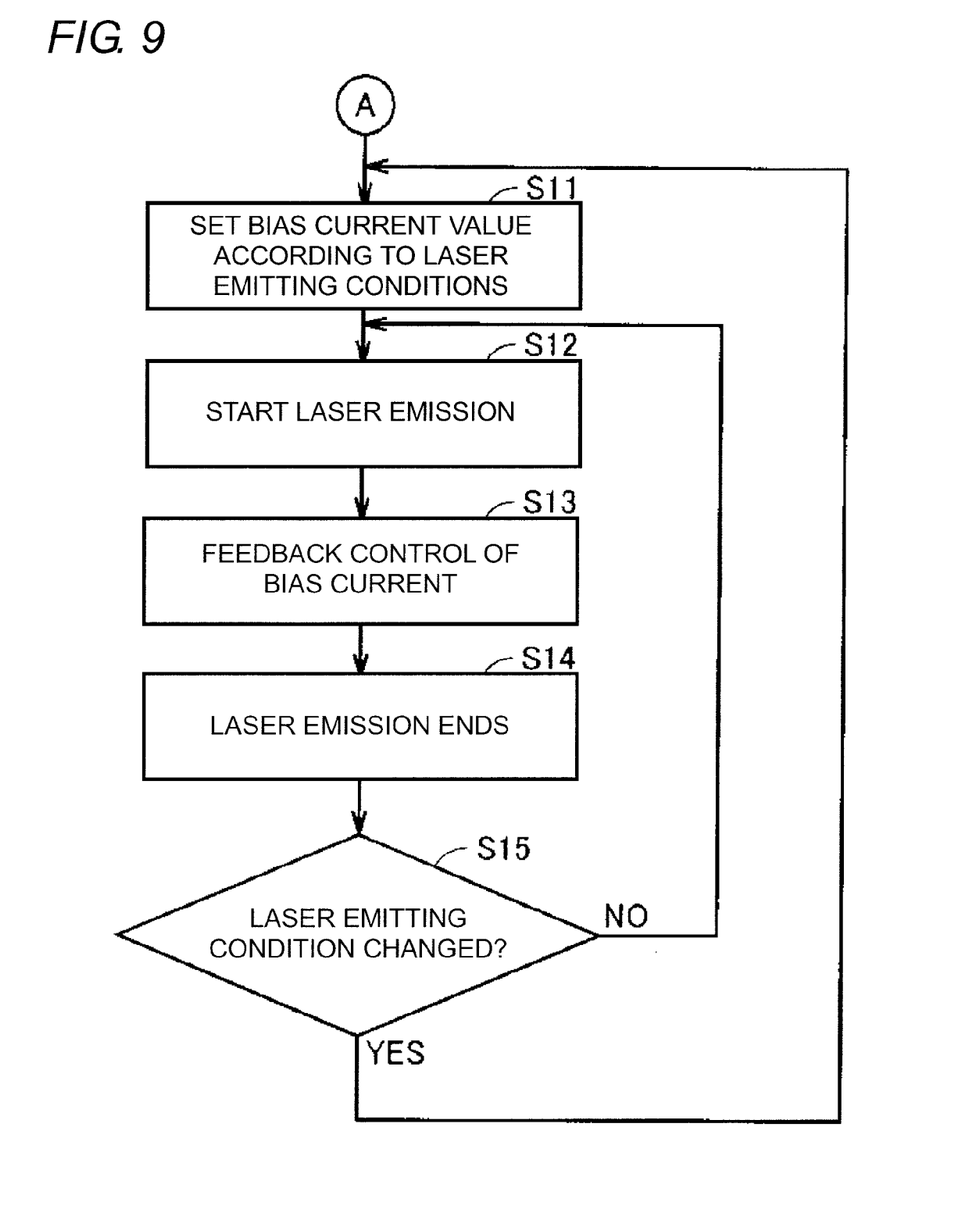
FIG. 9 is a flow chart for describing processing of the laser processing device after the starting according to an embodiment.

On the other hand, if it is determined that the bias current value of the exciting LD 3 has been decided for all the laser conditions (YES in step S7), the processing proceeds to step S11 (see FIG. 9).

Figure 8:
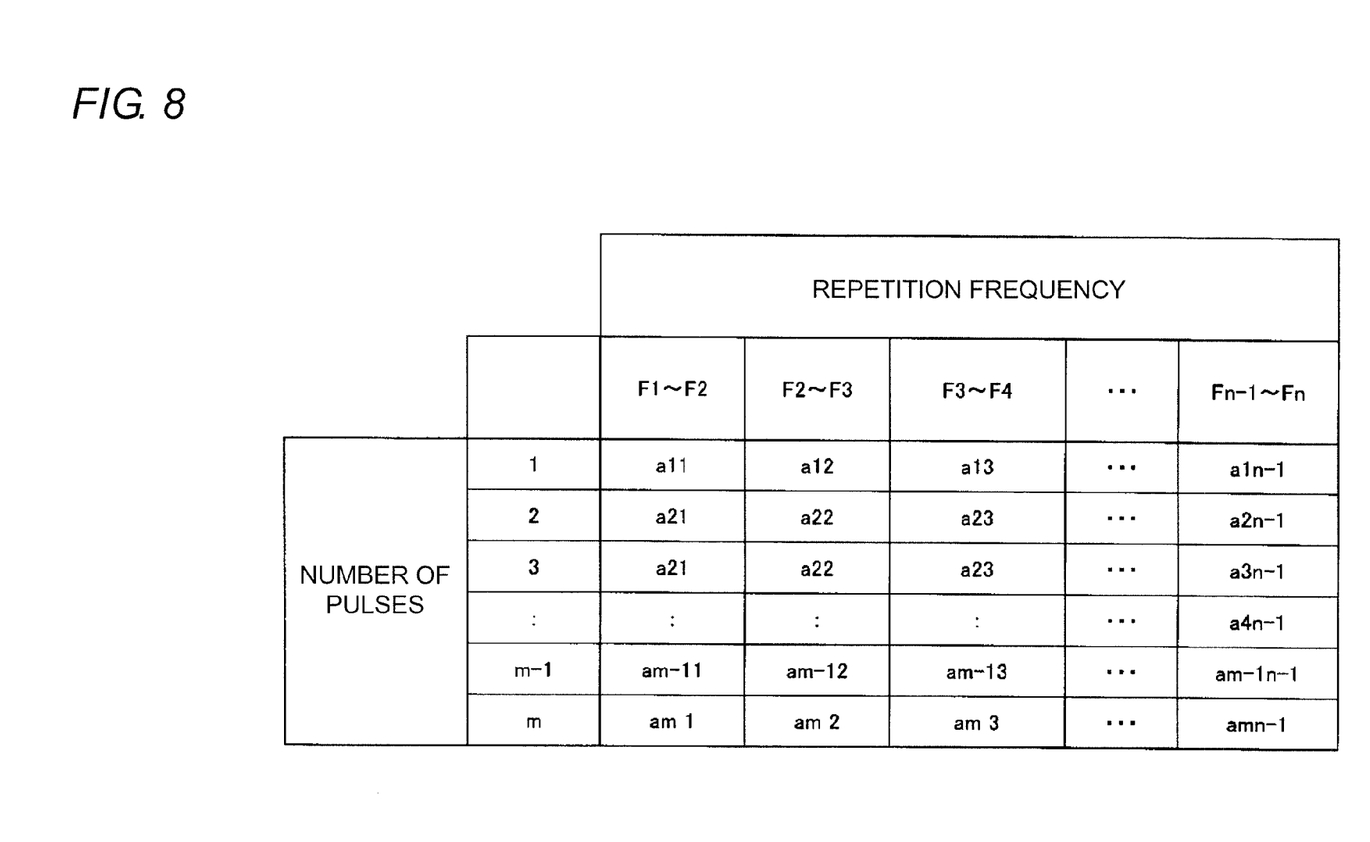
FIG. 8 is a diagram schematically showing a saving form of optimal values of bias current values.

FIG. 8 is a diagram schematically showing a saving form of the optimal values of the bias current values. In FIG. 8, the optimal values of the bias current of the exciting LD 3 are saved in the memory 41 in a table format.

Specifically, the optimal values corresponding to a combination of the range of repetition frequency of a group of pulses (for example, 100 kHz to 120 kHz) and the number of pulses included in a single group of pulses are stored in the table.

For example, the bias current value corresponding to a certain laser condition is previously decided as a default condition. The bias current values corresponding to the other laser conditions are decided as differences from the default current value by the processing in steps S3, S4, S6, and S9. The format of saving the optimal values is not limited to the table format and may be a database format, for example. Further, the bias current value of the exciting LD 3 of the main excitation period may be saved in the memory 41 in the table format as shown in FIG. 8.

FIG. 9 is a flow chart for describing processing of the laser processing device after the starting according to Embodiment 1. "After the starting" corresponds to the operating time of the laser processing device. In FIG. 9, the control device 20 (the signal processing circuit 40) sets the bias current value according to the laser emitting conditions in step S11. The laser emitting conditions are decided by referring to the table as shown in FIG. 8 based on the information input by the user via the input unit 25 (FIG. 1), for example. The laser emitting conditions include but not limited to the repetition frequency, the number of pulses included in a group of pulses, and the like. As a result of the processing, the bias current values of the exciting LD 3 of the main excitation period and the preliminary excitation period are decided respectively. When the laser processing device operates, the shutter 19 is opened by the control device 20.

In step S12, the laser emission is started. The control device 20 provides the bias current value of the main excitation period and the bias current value of the preliminary excitation period which are set in the processing in step S11 for the driver 22. The driver 22 supplies the current according to the bias current values to the exciting LD 3.

In step S13, the control device 20 performs the feedback control on the bias current. Specifically, the control device 20 performs the same processing as the processing in steps S3, S4, S5, S6, and S9. Consequently, the bias current value of the preliminary excitation period of the exciting LD 3 can be adjusted to make the peak values of the first pulses and the final pulses the same during the operation of the laser processing device. In step S14, the laser emission ends.

In step S15, the control device 20 determines whether any change is made to the laser emitting conditions. For example, if the processing conditions are changed, it is determined that a change is made to the laser emitting conditions. In that case (YES in step S15), the processing returns to step S11. On the other hand, if no change is made to the laser emitting conditions (NO in step S15), the processing is returned to step S12.

In the processing shown in FIG. 7, the optimal values of the bias current values of the exciting LD 3 for all the laser conditions are decided during starting of the laser processing device. If it is ensured that unevenness of the peak values of the first pulses and the final pulses are within the tolerance, however, a part or all of the optimal values of the bias current stored in the table may be fixed values. In those cases, the processing for obtaining the optimal bias current values during starting may be simplified or omitted. Consequently, the starting time, for example, can be shortened.

Further, in Embodiment 1, the optimal value of the bias current corresponding to a certain laser condition is adjusted by the feedback control on the bias current after the starting. When the laser conditions are changed, the adjustment to the optimal bias current corresponding to the laser conditions before the change is reflected to the optimal bias current corresponding to the laser conditions after the change (the adjustment is added or subtracted). Due to the temperature characteristic of the exciting LD 3, the optimal bias current may be adjusted during the operation of the laser processing device. Owing to the above described adjustment to the bias current, the optimal bias current can be obtained by taking account of the temperature characteristic of the exciting LD 3.

Assuming that the bias current during starting under the first laser condition is set to 10 and the bias current under the second laser condition is set to the value which is different from the bias current under the first laser condition by +5, for example. That is, the bias current during starting under the second laser condition is 15. It is assumed that the bias current of the exciting LD 3 changes from 110 to 11 while the laser processing device is operated under the first laser condition. If the laser condition is changed from the first laser condition to the second laser condition, the bias current becomes 11+5=16.

That is, the bias current corresponding to the laser conditions after the change changes relatively to the bias current corresponding to the laser conditions before the change. The values are used merely for description purposes and are not intended to limit the present disclosure.

Figure 10A:
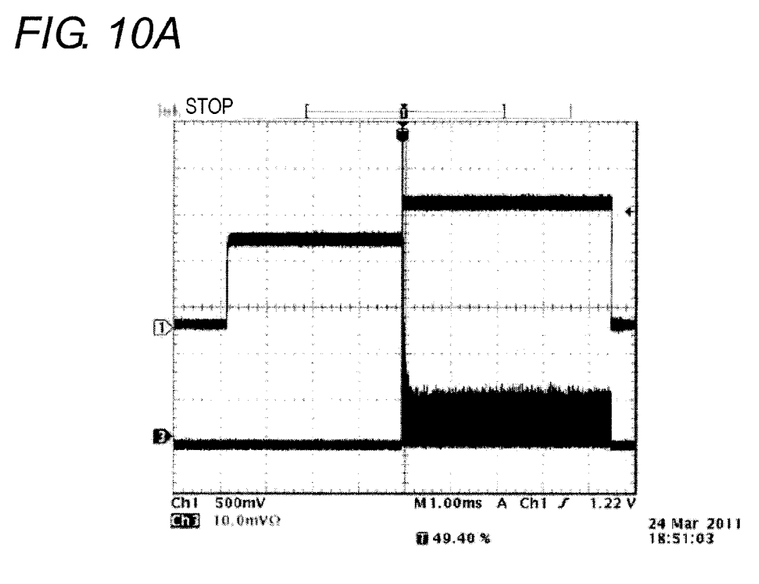
FIGS. 10A and 10B are waveform charts showing a laser output when a repetition frequency is increased and the number of pulses in a group of pulses is increased.
Figure 10B:
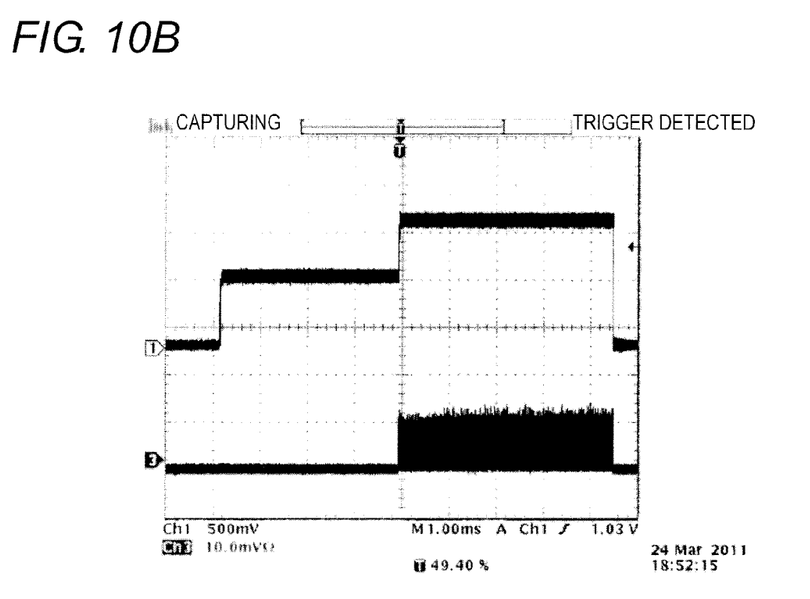

FIGS. 10A and 10B are waveform charts showing a laser output when the repetition frequency is increased and the number of pulses in a group of pulses is increased. FIG. 10A is a waveform chart of the laser output when the feedback control is not performed according to Embodiment 1. FIG. 10B is a waveform chart of the laser output when the feedback control is performed according to Embodiment 1. In FIGS. 10A and 10B, the difference between the bias current values before and after the change of laser condition is added or subtracted by the feedback control according to Embodiment 1. Consequently, the peak values of the first pulses and the final pulses can be made the same even if the laser condition is changed.

Figure 11A:
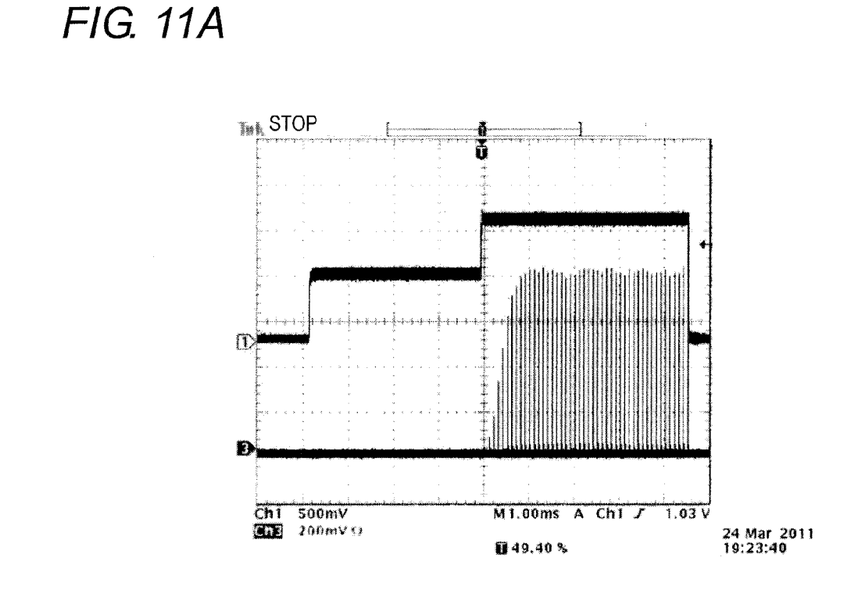
FIGS. 11A and 11B are waveform charts showing the laser output when the repetition frequency is decreased and the number of pulses in the group of pulses is decreased.
Figure 11B:
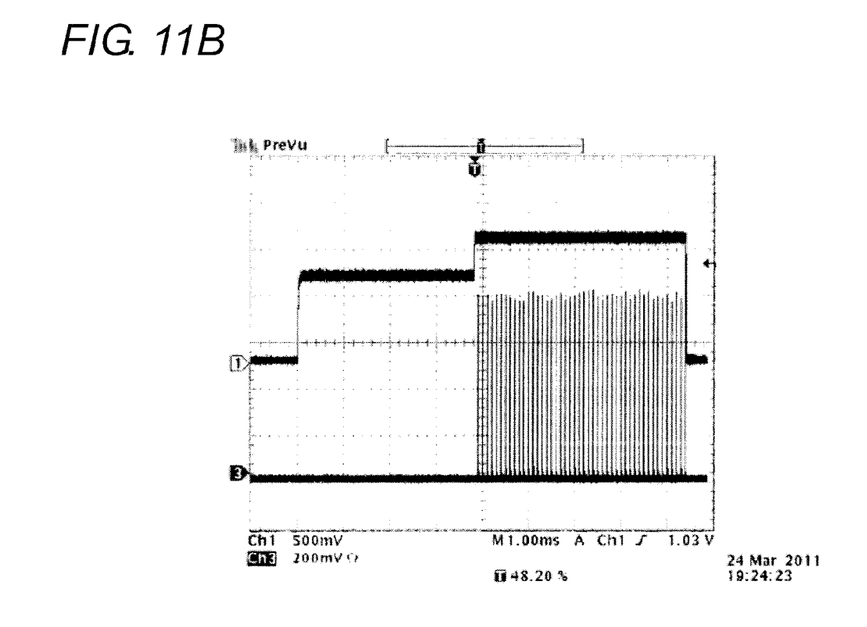

FIG. 11 is a waveform chart showing the laser output when the repetition frequency is decreased and the number of pulses in the group of pulses is decreased. FIG. 11A is a waveform chart showing the laser output when the feedback control is not performed according to Embodiment 1. FIG. 11B is a waveform chart of the laser output when the feedback control is performed according to Embodiment 1. In FIGS. 11A and 11B, the difference between the bias current values before and after the change of laser condition is added or subtracted by the feedback control according to Embodiment 1. Consequently, the peak values of the first pulses and the final pulses can be made the same even if the laser condition is changed.

As described above, in Embodiment 1, the preliminary excitation is performed to the light amplifying fiber 1 before the laser emission so that stable power can be obtained from the first pulses. Further, in Embodiment 1, the peak value is measured for each pulse (group of pulses), and based on the measurements, the bias current value of the exciting LD 3 is adjusted to make the peak values of the first pulses and the final pulses the same. Accordingly, the stabilized laser output can be realized from the first pulses. Therefore, according to Embodiment 1, high quality processing can be performed.

According to Embodiment 1, the optimal value of the bias current value is set for each laser condition during starting of the laser processing device and the optimal values are saved in the table. As a result, the power of the exciting light of the preliminary radiation period can be changed according to the laser condition.

Further, according to Embodiment 1, the optimal value of the bias current value is set by the feedback control even during the operation of the laser processing device. Accordingly, the stabilized laser output can be realized even if the laser condition is changed.

According to Embodiment 1, since the optimal value of the bias current is set by the feedback control during starting or operation of the laser processing device, not only the unevenness of the laser output power caused by uneven performance of the components but also the unevenness of the laser output power caused by the temperature characteristic of the performance of the components can be reduced. Therefore, the optimal values of the bias current values need not to be measured for each laser processing device to prepare the table. Moreover, the table needs not to be prepared by taking account of the temperature characteristic. Accordingly, increase of the cost of the laser processing device can be suppressed.

Embodiment 2

Figure 12:
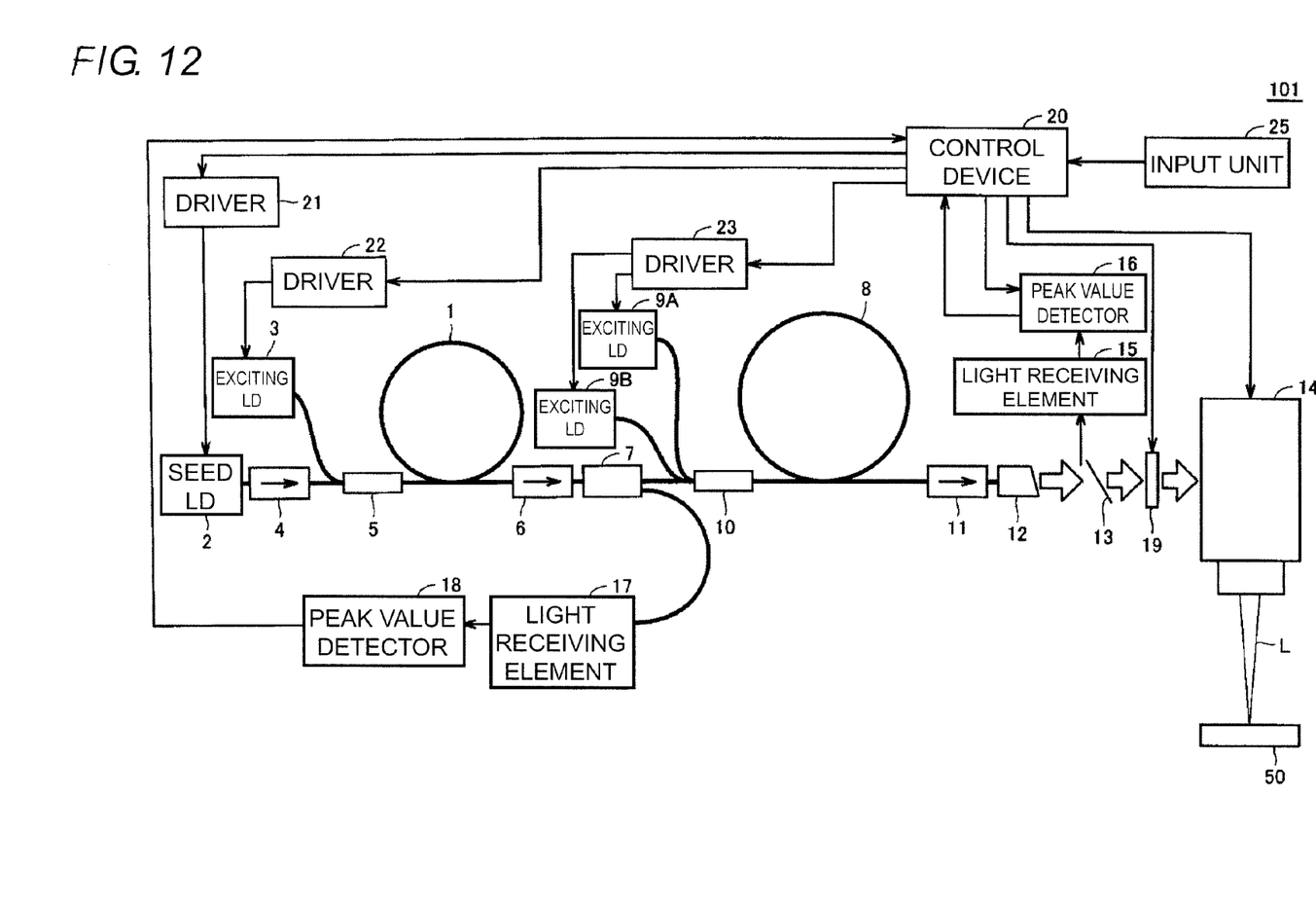
FIG. 12 is a configuration diagram of the laser processing device according to another embodiment.

FIG. 12 is a configuration diagram of the laser processing device according to Embodiment 2. In FIG. 12, a laser processing device 101 includes a light amplifier constituted of a two stage fiber amplifier. In that point, the laser processing device according to Embodiment 2 is different from the laser processing device according to Embodiment 1. In FIGS. 1 and 12, the laser processing device 101 is different from the laser processing device 100 in further including a coupler 7, a light amplifying fiber 8, exciting LDs 9A and 9B, a combiner 10, an isolator 11, a light receiving element 17, a peak value detector 18, and a driver 23.

The coupler 7 divides the light pulse output via the isolator 6 from the light amplifying fiber 1 into the light pulse to be sent to the combiner 10 and the light pulse to be sent to the light receiving element 17. The combiner 10 combines the laser light from the coupler 7 with the laser light from the exciting LDs 9A and 9B, and has them enter the light amplifying fiber 8.

The exciting LDs 9A and 9B are driven by the driver 23. The driver 23 is controlled by the control device 20. The light amplifying fiber 8 amplifies the laser light from the coupler 7 by the laser lights from the exciting LDs 9A and 9B.

That is, the laser light from the coupler 7 is the seed light and the laser lights from the exciting LDs 9A, 9B are exciting lights. The power of the exciting lights emitted from the exciting LDs 9A and 9B decreases in the preliminary excitation period and increases in the main excitation period.

The isolator 11 allows the laser light output from the light amplifying fiber 8 to pass while blocking the laser light returning to the light amplifying fiber 8.

The light receiving element 17 receives the light pulse from the coupler 7 and outputs a signal indicating the strength of the light pulse. The peak value detector 18 detects the peak value of the light pulse by the signal from the light receiving element 17. The peak value detected by the peak value detector 18 is sent to the control device 20.

The configuration of the light receiving element 17 and the peak value detector 18 is the same as the configuration of the light receiving element 15 and the peak value detector 16. In Embodiment 2, the peak value of the light pulse output from the light amplifying fiber 1 is detected by the light receiving element 17 and the peak value detector 18, and the peak value of the light pulse output from the light amplifying fiber 8 is detected by the light receiving element 15 and the peak value detector 16. Since the configuration of the other components of the laser processing device 101 is the same as the configuration of the corresponding components of the laser processing device 100, it is not described again below.

According to Embodiment 2, the control device 20 controls the driver 22 based on the peak value of the pulses detected by the light receiving element 17 and the peak value detector 18. Accordingly, the pulse emitted from the light amplifying fiber 1 can be controlled to make the peak values of the first pulses and the final pulses of the group of pulses emitted from the light amplifying fiber 1 the same. Further, the control device 20 controls the driver 23 based on the peak value of the pulses detected by the light receiving element 15 and the peak value detector 16.

Accordingly, the pulse emitted from the light amplifying fiber 8 can be controlled to make the peak values of the first pulses and the final pulses of the plurality of pulses emitted from the final amplifying stage, i.e., the light amplifying fiber 8, the same. Since the controlling method according to Embodiment 1 can be applied to the method for controlling the pulse emitted from the light amplifying fiber 8, it is not described again in detail below.

As described above, according to Embodiment 2, the stabilized laser pulse output can be obtained from the final amplifying stage even if a plurality of the amplifying stages are used. The number of the amplifying stages is not limited to two and may be any number such as three or more.

Also, the number of the exciting LDs provided for each amplifying stage is not limited to those shown in FIGS. 1 and 12, and any number of exciting LDs may be set.

Further, although the laser processing device has been disclosed as a using form of the light amplifier in the above described embodiments, the use of the light amplifier according to the embodiments of the present disclosure. is not limited to the laser processing device.

It should be construed that the embodiments disclosed here are not for limiting but for exemplifying the present disclosure. in all aspects. The scope of the present disclosure is defined not by the above description but by the appended claims and all modifications within the equivalent meaning and scope of the appended claims are intended to be included in the disclosure.

What is claimed is:

1. A light amplifier, comprising:

a light amplifying fiber that amplifies seed light by exciting light;

a seed light source that pulses the seed light a plurality of times during an emission period;

an excitation light source that generates the exciting light of a power at a first level, during a non-emission period which is immediately before the emission period, and generates the exciting light of a power at a second level, which is greater than a power of the first level during the emission period;

a detector that detects a power of an output light pulse that is output from the light amplifying fiber; and a controller that controls the power at the first and second levels of the exciting light of the non-emission period, based on a value of the detected power from the detector, to cause a power of first output light pulses, which are generated during the emission period, to be the same as a power of final output light pulses, wherein a length of the emission and non-emission periods respectively correspond to a length of pulse and non-pulse outputs of the seed light source.

2. The light amplifier according to claim 1, wherein, during starting of the light amplifier, the controller controls the power of the exciting light during the non-emission period for each of predetermined conditions of the output light pulse and obtains data on the power of the exciting light for causing the power of the first output light pulses to be the same as the power of the final output light pulses, and wherein the light amplifier further comprises a storage that stores the data in association with the predetermined conditions of the output light pulses.

3. The light amplifier according to claim 2, wherein when the light amplifier is operated, the controller sets the power of the exciting light of the non-emission period based on the data stored in the storage.

4. The light amplifier according to claim 3, wherein the exciting light source is a semiconductor laser, and the data comprises data on a bias current in the semiconductor laser, and when the conditions for the output light pulse are changed, the controller reflects the change made to the data on the bias current corresponding to the conditions before the change to the data on the bias current corresponding to the conditions after the change.

5. The light amplifier according to claim 2, further comprising a shutter that prevents the output light pulse from being output to the outside of the light amplifier, wherein the controller obtains the data during starting of the light amplifier with the shutter closed.

6. A laser processing device comprising the light amplifier according to claim 1.

7. A laser processing device comprising the light amplifier according claim 2.

8. A laser processing device comprising the light amplifier according to claim 3.

9. A laser processing device comprising the light amplifier according to claim 4.

10. A laser processing device comprising the light amplifier according to claim 5.

* * * * *